Aug. 29, 1967  S. AUSNIT  3,338,284
SHEET WITH FASTENER STRUCTURE
Filed July 22, 1963  2 Sheets-Sheet 1
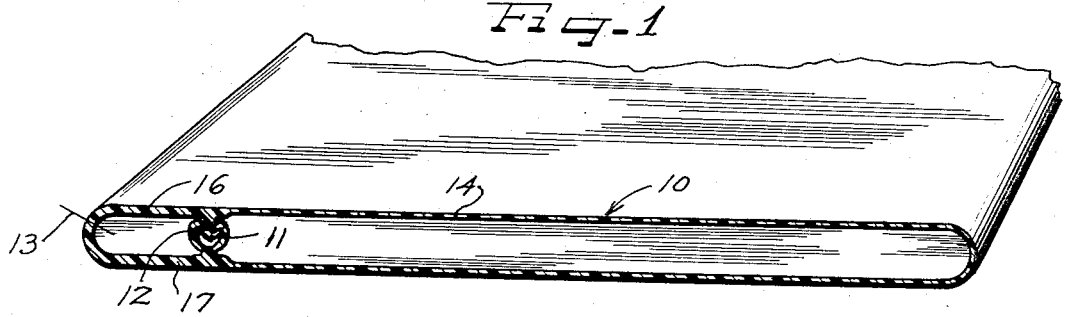
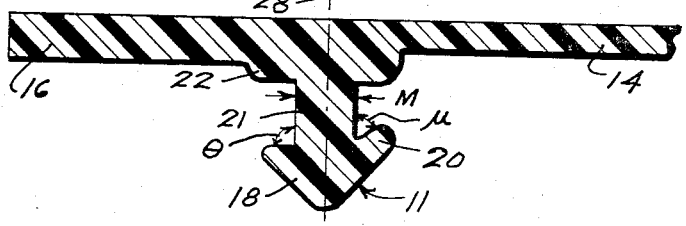
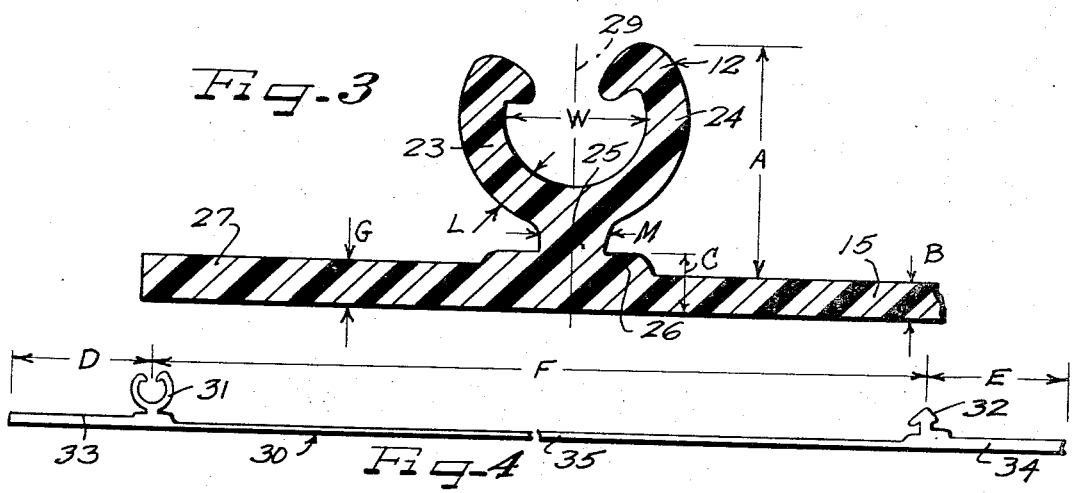
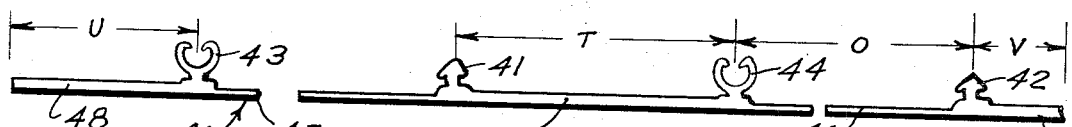
INVENTOR.
Steven Ausnit
BY
ATTORNEYS Aug. 29, 1967  S. AUSNIT  3,338,284
SHEET WITH FASTENER STRUCTURE
Filed July 22, 1963  2 Sheets-Sheet 2
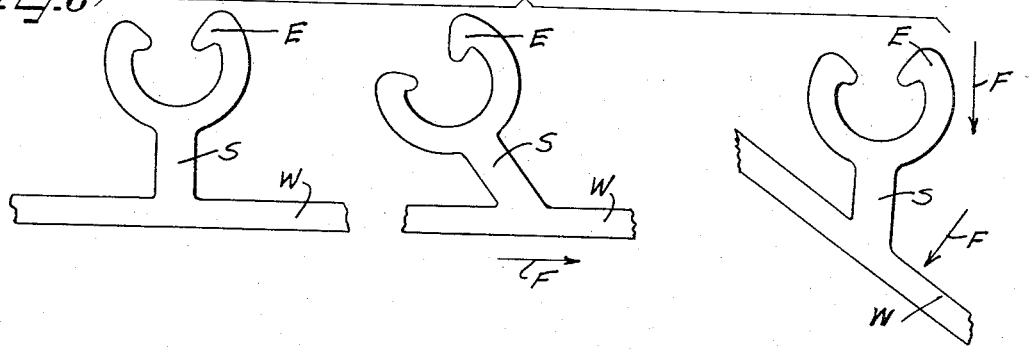
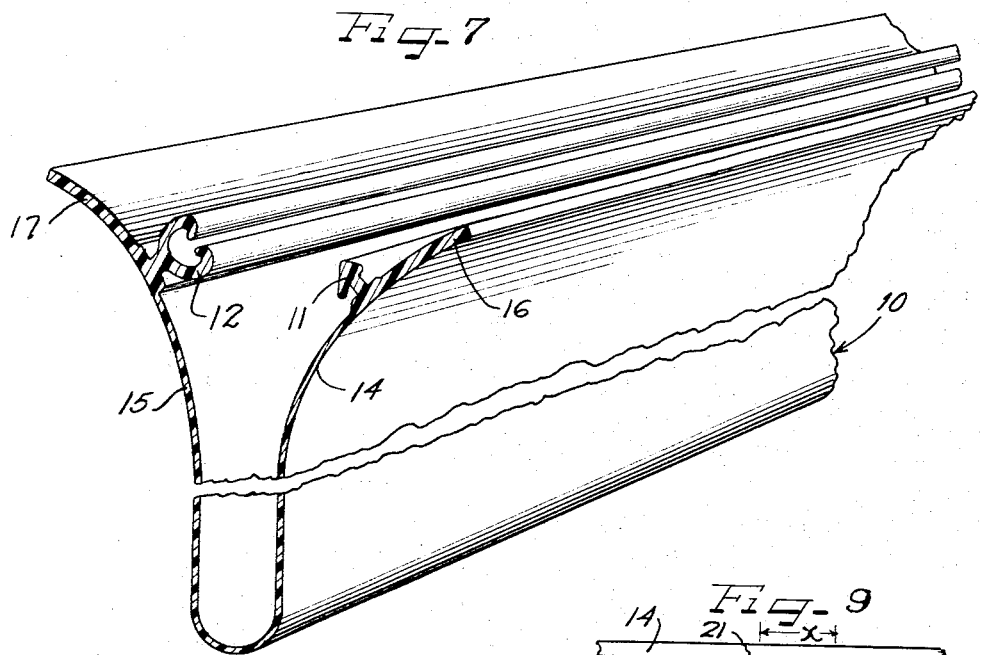
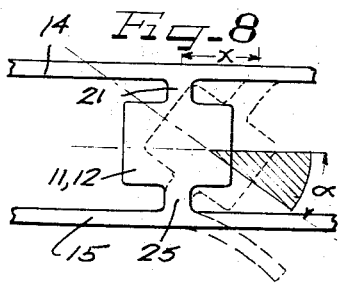
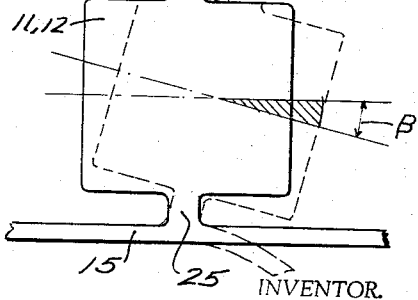
INVENTOR.
Steven Ausnit
BY
ATTORNEYS

United States Patent Office 3,338,284
Patented Aug. 29, 1967

3,338,284
SHEET WITH FASTENER STRUCTURE
Steven Ausnit, 124 E. 61st St., New York, N.Y. 10021
Filed July 22, 1963, Ser. No. 296,760
6 Claims. (Cl. 150—3)

The present invention relates to improvements in flexible fasteners and more particularly to improvements in one piece containers or bags formed of flexible thin plastic film with integral interlocking profiles on the inner surfaces of the film.

Flexible fasteners have been used for providing reclosable fastener elements for bags and similar containers. The fasteners generally embody strips on inner facing surfaces of walls which have coacting releasably interlocking rib and groove elements which join to close the walls on which the elements are located by the application of a pressing force, and which can be opened to separate the walls by forcibly drawing the elements apart. The rib and groove elements have been usually carried on the surfaces of closure strips which are attached to the upper edges of the walls of a bag such as by heat sealing the strips to the walls. With the strips and bags made of a conventional material such as polyethylene it has been necessary to make the bag walls and the material of the closure strips of substantial thickness so that they can be joined by heat sealing without inadvertently forming leakage holes or damaging the material. This has often required the use of material much heavier than necessary to provide a bag of adequate strength.

Methods have been discovered for making material for containers or bags having fastener strips wherein the strips and bag walls can be made of one piece thereby avoiding the step of heat sealing the strips to the bag and making it possible to provide a bag wall only as thick as needed for the strength of the bag, and without providing extra thickness for enabling sealing of strips to the material. With these methods bag walls of 1 or 1½ mils may be employed whereas heretofore was impractical to provide bag walls of thicknesses of less than approximately 3 to 4 mils since that thickness was required for suitable heat sealing.

With very thin bag walls different flex conditions are encountered from those of heavier bag walls, which, in turn, effect the elements of the fasteners with different reactions.

Accordingly, an object of the present invention is to provide an improved flexible fastener structure which has improved holding capability particularly when used on a very thin flexible supporting wall.

Another object of the invention is to provide an improved fastener structure embodying an arrowhead shaped rib element with a groove element for receiving it wherein the size relationship between the parts is such to obtain optimum holding strength and to avoid accidental opening from forces acting on the walls of the bag from within the bag and to insure ease of opening from the bag top.

A further object of the invention is to provide an improved flexible fastener wherein the fastener is supported on a bag wall which is very thin and wherein portions of the fastener and of the supporting wall are constructed heavier or lighter in size relationships for either obtaining or preventing flexibility of the parts to obtain improved holding ability for the fastener.

A further object of the invention is to provide an improved sheet with integral fastener profiles thereon and a unique spacing between the profiles for obtaining advantages over structures heretofore available. Other objects, advantages and features will become more apparent with the teaching of the principles of the invention in connection with the disclosure of the preferred embodiments thereof in the specification, claims and drawings, in which:

FIGURE 1 is a sectional view taken through tubular material adapted for forming flexible containers and having a flexible fastener structure constructed in accordance with the principles of the present invention;

FIGURE 2 is an enlarged fragmentary sectional view of the rib element of the fastener structure;

FIGURE 3 is an enlarged fragmentary sectional view of the groove element of the fastener structure;

FIGURE 4 is a sectional view shown in somewhat schematic form of a sheet for forming a container having fastener elements thereon;

FIGURE 5 is a sectional view of a sheet having fastener structures thereon, illustrating modifications;

FIGURE 6 is a schematic showing of two strips showing the effect of forces on the strips;

FIGURE 7 is a perspective view with parts broken away of a container embodying the features of the invention; and FIGURES 8 and 9 are schematic drawings illustrating the effect of shifting of the walls of the container on the fastener elements with elements of different sizes being used in the respective figures.

On the drawings:

FIGURE 1 illustrates an elongated flexible plastic tube 10 of materials such as polyethylene or synthetic resin film which is suitable for forming bags or pouches. The thickness of the material is chosen in accordance with the use to which the bag is to be adapted in order to provide adequate tensile strength, tear strength, pressure resistance impact strength and the like. For a reusable bag which is sold with the products, such as that holding a pair of gloves, light-weight plastics on the order of 1 or 1½ mils may be used and the weight of the material need be no stronger than that required for the function of the bag.

Integral with the material of the tube are elements of a fastener structure including a rib element 11 and a groove element 12, with these elements being shown in greater detail in FIGURES 2 and 3. The rib and groove elements 11 and 12 are integral with and of one piece with the film and are preferably formed in a single extrusion operation with the bag film. The rib and groove elements may be very small and are shown somewhat enlarged in the drawings for ease of illustration. As shown, one side of the bag, i.e. one layer of the film is illustrated at 14 supporting the rib element 11 and the other layer of film 15 supports the groove element 12, with the film extending beyond the elements 11 and 12 providing flanges 16 and 17 which will project above the elements at the top of the bag in the manner illustrated in FIGURE 7 which shows a form of semi-completed bag. To form the flanges 16 and 17 a continuous slit 13 may be cut along the top of the tube 10 and the slit may be positioned so that the flanges 16 and 17 are unequal in length for ease of grasping.

Referring to FIGURE 7 end seams (not shown) are provided transversely across the tube 10 to form the edges of the bag and the fastener elements 11 and 12 are joinable to close the bag by applying a force inwardly pressing the elements together, and are separable by grasping the flanges 16 and 17 and drawing them apart in the manner shown in the illustration.

While the features of the fastener structure which will be further described in connection with FIGURES 2 and 3 is primarily employed as made integrally with a bag made of a thin film, its useful functions may also be used to advantage in other structures such as by being embodied in separate fastener strips which are attached to sheets and used to join the edges of the sheets and which, for example, may be made separately and attached to the upper edges of bags which also are manufactured separately.

The bag walls 14 and 15 as shown in FIGURES 1–3 and 7, are preferably very thin on the order of 1 and 2 mil sheets and are preferably under 2 mils when formed of a material such as polyethylene inasmuch as a sheet of this thickness provides adequate strength for most purposes and creates a flexibility in the sheet which does not apply an undesirable bending moment arm from inside the bag to the fastener elements 11 and 12 which would tend to dislodge and separate them. Containers heretofore made of heavier sheets found it necessary to encounter these bending moment arms and had to contend with the disadvantages of the stiffness of the material and attempts were made to find ways to keep them interlocked. In the present arrangement however where the fastener structure is preferably continuously integral and of one piece with the entire bag the flexibility and lack of bending moment arm is utilized in providing interlocking elements which do not encounter substantial unlocking forces from inside the container due to the stiffness of the sheet but enjoy improved interlocked security because of sheet flexibility. It is of course possible to use the fastener structure shown and described with heavier sheets in some instances with a maximum practical sheet thickness being on the order of 7 mils.

It is an essential requirement of the present structure as used with very light-weight thin films of under 2 mils that the rib and groove elements 11 and 12 project integrally from the surface of the sheet at right angles to the plane of the sheet. This is illustrated by the axes 28 and 29 of the elements 11 and 12 which project at right angles to the sheets 14 and 15.

It is also an essential element of the structure that the rib and groove elements 11 and 12 be spaced inwardly from the top of the container so as to provide integral flanges 16 and 17 above the elements 11 and 12. The fastener elements 11 and 12 are constructed so that they are intentionally very difficult to separate by forces applied to the walls 14 and 15 below the elements 11 and 12, primarily so that forces on the bag walls from within the bag do not separate the fastener elements. The thinness of material makes it impossible to attach opening elements and to use sliders of conventional structure so that separation is effected by drawing apart the flanges 16 and 17. In a preferred arrangement the flanges 16 and 17 are made thicker than the thickness of the film of the side walls 14 and 15, or in other words, the dimension G is larger than the dimension B, FIGURES 2 and 3. In addition to providing a flange 16 and 17 which will not stretch or deform and which can be readily gripped, the extra thickness of the flange aids in the opening function in better transferring forces to the base of the rib and groove elements 11 and 12 and thereby making it easier to separate the rib from the groove when the flanges are bent apart as will occur when they are gripped between the thumb and forefingers of the two hands and pulled apart in the manner shown in FIGURE 7. This is the exact opposite of the situation created inside the bag where the pulling apart of the bag walls below the fastener should not separate the ribs from the grooves.

For increasing the strength of attachment of the fastener elements 11 and 12 to the film of the walls 14 and 15 and for keeping these elements at right angles to the film wall a base area 22 and 26 may be provided which is a thickening of the film at the location where the stems 21 and 25 of the elements at the location where the stems 21 and 25 of the elements join the film. This thickness is increased only adequately to prevent the fastener elements from tearing the walls at their base and for keeping the elements at right angles. The thickness of this material is shown at C.

As above mentioned, the axes of the rib and groove elements 11 and 12 are at right angles to the film and the elements are spaced from the top edges of the bag. I have found that a unique set of problems exist with this arrangement not present where the elements are at the edge of the sheet or bag and which do not exist where the elements are at an angle to the bag. The elements should be at right angles to the film however to prevent the elements from pushing each other aside and not interlocking.

The supporting stems or necks 21 and 25 for the elements must be of sufficient size to prevent the elements from tearing loose when pulled apart but must be sufficiently narrow so as to be flexible to provide a hinging action. If the stem is made too thin it will hinge from side to side too easily and the rib and groove will tend to push each other aside. If the stems 21 and 25 are too thick the hinging action will not be present and forces on the bag walls from the contents of the bag will separate the elements 11 and 12. If the stems 21 and 25 are extremely broad, they will provide in effect a long lever arm, which will act on the groove element 12 to bend it relative to the rib element when forces are applied parallel or at right angles to the bag wall 15. With the provision of the thin stem 25 a hinge effect results preventing inadvertent separation of the elements 11 and 12. FIGURE 6 illustrates the effect of forces F on a bag wall W in acting on the stem S and fastener element E. The first showing illustrates no forces; the second, forces parallel to the wall; and the third, forces acting outwardly on the wall. The size of the stem must be related to the thickness of the film walls so that the stem has a thickness at least 6 times the film thickness. In other words, the ratio of the dimension M to the dimension B is at least 6 to 1.

The flexibility of the stem is also related to the thickness and flexibility of the jaws 23 and 24 of the groove element. If the groove element is constructed with heavier less flexible jaws the stem thickness can be greater, since the lock will be stronger and therefore the stem can hinge less. The thickness of the stem 25 should be under 3 times the thickness of the jaws or, in other words, the ratio of M to L is less than 3 to 1.

Another relationship which I have found to be necessary is to relate the thickness of the stem 25 of the groove element to the overall width of the groove element 12 as indicated by the distance W which is the width of the groove. The thickness of the stem 25 should be less than the width between the inner surfaces of the groove or, in other words, M must be less than W. This establishes a relationship for the parts, and the film thickness will first be chosen for minimum thickness to provide the physical strength required, and the size of the rib and groove element will then be selected establishing the size of the stem 25. Preferably, the stem 21 is substantially of the same size as the stem 25.

It has heretofore been believed that the rib and groove elements should be as small as possible to effect a saving of material and to reduce size for stocking. Contrary to this belief, I have discovered that rib and groove elements made larger than the minimum required size are advantageous and provide better holding abilities. This phenomenon is illustrated in FIGURES 8 and 9 where FIGURE 8 shows a small rib and groove element and FIGURE 9 shows a larger more advantageous size for the rib and groove elements 11, 12.

With reference to FIGURE 8, wherein a small rib and groove element 11, 12 is shown, with the rib and groove as combined shown schematically by the rectangle, the wall 14 is shown shifted to the right a distance X such as will occur during handling of the bag. The stem 25 and the stem 21 will have to flex, and the amount of flexing will be related to the amount of rotation encountered by the combined rib and groove elements 11, 12, which is indicated by the angle α.

By contrast, FIGURE 9 shows a larger rib and groove element 11, 12 with the wall 14 shifted to the right the same distance X. The rib and groove element rotates about its axis an angle β. It will be noted that the angle of rotation β for a larger rib and groove element is smaller than the angle of rotation α for a smaller rib and groove element, and this will cause less flexure of the stems 21 and 25 and less stress on the parts of the rib and groove elements and less tendency to accidently separate. I found that the height for the groove element should be a minimum of 15 times the thickness of the sheet employed for satisfactory operation.

In order that the rib and groove elements will strongly resist a separation from forces on the walls within the bag, the head 18 of the rib element is constructed with side hooks 19 and 20 and the hook 20 substantially longer than the hook 19. Similarly the jaw 24 of the rib element is substantially longer than the jaw 23. Also, the under surface of the hook 20 has a sharper angle than the under surface of the hook 19. In other words, the angle μ is smaller than the angle θ.

FIGURE 4 illustrates a flat sheet such as is obtainable after slitting the tube 10 of FIGURE 1, with the sheet shown at 30. A rib element 32 projects upwardly at right angles from the upper surface of the sheet and a groove element 31 projects upwardly from the same surface of the sheet element. The sheet area 35 between the elements 31 and 32 form the body of the bag, and the flange areas 33 and 34 outwardly of the elements 31 and 32 will form the flanges at the bag top. The elements are spaced apart a distance F and are spaced inwardly from the edges of the sheet distances D and E. The distances D and E are different so that in the finished bag one lip or flange is higher than the other to facilitate opening. The length of the maximum distance from the element 31 or 32 to the edge of the flange (D or E) is under ⅕ of the distance F between the fastener elements 31 and 32.

FIGURE 5 illustrates a sheet 48 with multiple fastener elements thereon and rib and groove elements 41 and 43 will coact for forming one bag and rib and groove elements 42 and 44 will coact for another bag. The sheet area between the rib and groove elements 41 and 43 is shown at 45, and the sheet area between the rib and groove elements 42 and 44 is shown at 46, with the flange for above the rib element 42 shown at 49, and the flange for above the groove element 43 shown at 48. The area 47 between the elements 41 and 44 will be slit down its center to form two separate flanges respectively for the groove element 44 and the rib element 41, and the total distance T between the elements 41 and 44 may be selected to be less than three times the distance U or the distance V which latter distances indicate the length of the flanges 48 and 49.

Thus, it will be seen that I have provided an improved container structure as above disclosed which meets the objectives and advantages set forth. The structure obtains a container which uses less material than containers heretofore available, and provides a container which is more secure and is less apt to accidentally become opened from stacking or handling and yet which is readily opened from the outside for access to the contents.

The relationships set forth have been found to provide a closure with improved operation over those heretofore available and to be operable with a thin wall bag wherein other types of closures have proven inadequate.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A pouch structure comprising,
a pair of opposed facing parallel supporting walls joined at their edges for forming a pouch and having a thickness less than 3 mils, a rib element on the inner surface of one of the walls forming an integral part of the wall and projecting therefrom,
a groove element on the inner surface of the other wall facing said rib element and forming an integral part of the wall projecting therefrom for releasably interlockingly receiving the rib element to join the walls and close the pouch, said rib and groove elements each attached to the walls by flexible hinge-like stems projecting a distance to permit bending with a hinge-like action,
integral flange element forming continuations of said walls projecting above said elements with said elements spaced from the edges of the walls and being separable by drawing the flanges apart from above the container,
said groove element projecting from said wall a distance at least 15 times the thickness of the wall.

2. A flexible fastener structure comprising,
a pair of opposed facing parallel supporting walls having a thickness less than 3 mils forming continuous parts of the walls of a container, a rib element forming an integral part of one of said walls and projecting therefrom, a groove element forming an integral part of the other wall and projecting therefrom for releasably interlockingly receiving the rib element to join the walls and close the container,
said elements spaced from the edges of the walls and separable by drawing said walls apart from outside of the container,
said elements each having a flexible stem portion of less width than the element projecting outwardly from the wall at right angles thereto a distance to permit bending with a hinge-like action,
said stem portion having a thickness greater than 6 times the thickness of said wall.

3. A flexible fastener structure comprising,
a continuous rib element projecting upwardly from the surface of a sheet member,
and a continuous groove element projecting upwardly from the surface of a sheet member,
said groove element having jaws and a stem supporting the jaws integral with the sheet member,
the thickness of said stem being less than three times the thickness of said jaws and of such thickness to permit bending with a hinge-like action.

4. A flexible fastener structure comprising,
a continuous rib element projecting upwardly from the surface of a sheet member,
and a continuous groove element projecting upwardly from the surface of a sheet member,
said groove element having jaws for receiving the rib element therebetween having a distance W between said jaws, said jaws supported by a stem integral with the sheet member and having a thickness M,
said thickness M being less than said distance W and of such thickness to permit bending with a hinge-like action.

5. A structure for forming a flexible container comprising,
an extended flat thin flexible plastic sheet,
a first continuous rib element integral with the sheet projecting upwardly from the surface of the sheet and extending along adjacent a first edge of the sheet with a flange area between the first rib element and first sheet edge,
a first continuous groove element forming an integral part of the sheet and projecting upwardly therefrom on the same surface as said first rib element and extending along a second edge of the sheet parallel thereto and parallel to the first rib element spaced from the second edge of the sheet a distance to form a flange,
a second rib element extending along the sheet parallel to the first groove element and spaced inwardly therefrom, and a second groove element extending along the sheet parallel to the first rib element and spaced inwardly therefrom, the distance between said second rib element and said second groove element being less than three times the distance of each of said first rib element and said first groove element from said first and second edges of the sheet.

6. A flexible fastener structure comprising, a pair of opposed facing parallel supporting walls of a flexible plastic material forming parts of the walls of a container, a rib element forming an integral part of one of said walls and projecting therefrom having an arrowhead shape with side hooks having undersurfaces which slope toward the wall in a direction outwardly from the center of the rib element.

a groove element forming an integral part of the other wall and projecting therefrom having hook-shaped sides for releasably interlockingly receiving the rib element to join the walls and close the container with the hook-shaped sides resiliently hooking over the sides of the rib element, said rib element and said groove element each supported on a flexible neck portion integral with the wall of the container and projecting therefrom a distance to permit bending with a hinge-like action, said elements spaced from the edges of the walls and separable by drawing said walls apart from outside of the container, and a base area joining each of the elements to the wall by being integral with the neck portions and the wall with the base area of at least one of said elements being thicker than said wall.

References Cited

UNITED STATES PATENTS

| | | | |
|---|---|---|---|
| 2,520,467 | 8/1950 | Merralls | 150—3 |
| 2,674,289 | 4/1954 | Silverman | 150—3 |
| 2,746,502 | 5/1956 | Graell | 150—3 |
| 2,978,769 | 4/1961 | Harrah | 150—3 |

FOREIGN PATENTS

| | | |
|---|---|---|
| 595,874 | 4/1934 | Germany. |
| 97,451 | 12/1961 | Norway. |

FRANKLIN T. GARRETT, *Primary Examiner.*